United States Patent
Herberg et al.

(10) Patent No.: US 11,219,904 B2
(45) Date of Patent: Jan. 11, 2022

(54) FACILITY FOR THE CENTRIFUGAL CLARIFICATION OF A SUSPENSION

(71) Applicant: GEA MECHANICAL EQUIPMENT GMBH, Oelde (DE)

(72) Inventors: Wolf-Dietrich Herberg, Witten (DE); Meinolf Berlage, Rheda-Wiedenbrück (DE)

(73) Assignee: GEA MECHANICAL EQUIPMENT GMBH, Oelde (DE)

(*) Notice: Subject to any disclaimer, the term of this patent is extended or adjusted under 35 U.S.C. 154(b) by 0 days.

(21) Appl. No.: 17/054,211

(22) PCT Filed: Jul. 2, 2018

(86) PCT No.: PCT/EP2018/067803
§ 371 (c)(1),
(2) Date: Nov. 10, 2020

(87) PCT Pub. No.: WO2019/007903
PCT Pub. Date: Jan. 10, 2019

(65) Prior Publication Data
US 2021/0138486 A1   May 13, 2021

(30) Foreign Application Priority Data
Jul. 6, 2017 (DE) ................. 10 2017 115 112.5

(51) Int. Cl.
*B04B 11/02* (2006.01)
*F16L 55/053* (2006.01)
*B04B 15/06* (2006.01)

(52) U.S. Cl.
CPC .............. *B04B 11/02* (2013.01); *B04B 15/06* (2013.01); *F16L 55/053* (2013.01)

(58) Field of Classification Search
CPC ......... B04B 11/02; B04B 15/06; F16L 55/053
(Continued)

(56) References Cited

U.S. PATENT DOCUMENTS

| 5,267,937 A | 12/1993 | Zettier et al. |
| 10,422,327 B2 | 9/2019 | Horwath et al. |
| 2005/0089428 A1 | 4/2005 | Navarro |

FOREIGN PATENT DOCUMENTS

| DE | 60791 A | 4/1891 |
| DE | 1557576 A1 | 4/1970 |

(Continued)

OTHER PUBLICATIONS

International Preliminary Report on Patentability dated Jan. 7, 2020 in related/corresponding International Application No. PCT/EP2018/067803.
(Continued)

*Primary Examiner* — Walter D. Griffin
*Assistant Examiner* — Shuyi S. Liu
(74) *Attorney, Agent, or Firm* — Patent Portfolio Builders PLLC

(57) ABSTRACT

A facility for the centrifugal clarification of a suspension includes a centrifuge and a device with a container having a tubular envelope surface at least in sections for conducting the medium, which is arranged on a liquid outlet of the centrifuge. The container with a tubular envelope surface at least in sections includes an inlet for supplying a pressurizing gas, and the volume of the container with a tubular envelope surface at least in sections is smaller than the double receiving volume of the centrifuge.

14 Claims, 1 Drawing Sheet

(58) Field of Classification Search
USPC .................................... 494/56, 61; 417/540
See application file for complete search history.

(56) References Cited

FOREIGN PATENT DOCUMENTS

| | | |
|---|---|---|
| DE | 4004459 C1 | 3/1991 |
| DE | 19534855 C1 | 6/1997 |
| DE | 19706578 A1 | 10/1998 |
| DE | 102004022078 A1 | 11/2005 |
| DE | 102014212021 A1 | 12/2015 |

OTHER PUBLICATIONS

International Search Report dated Sep. 18, 2018 in related/corresponding International Application No. PCT/EP2018/067803.
Office Action dated Mar. 19, 2018 in related/corresponding DE Application No. 10 2017 115 112.5.
Written Opinion dated Sep. 18, 2018 in related/corresponding International Application No. PCT/EP2018/067803.
Troost et al., "Sekt, Schaumwein, Perlwein," 1995, pp. 397-405.

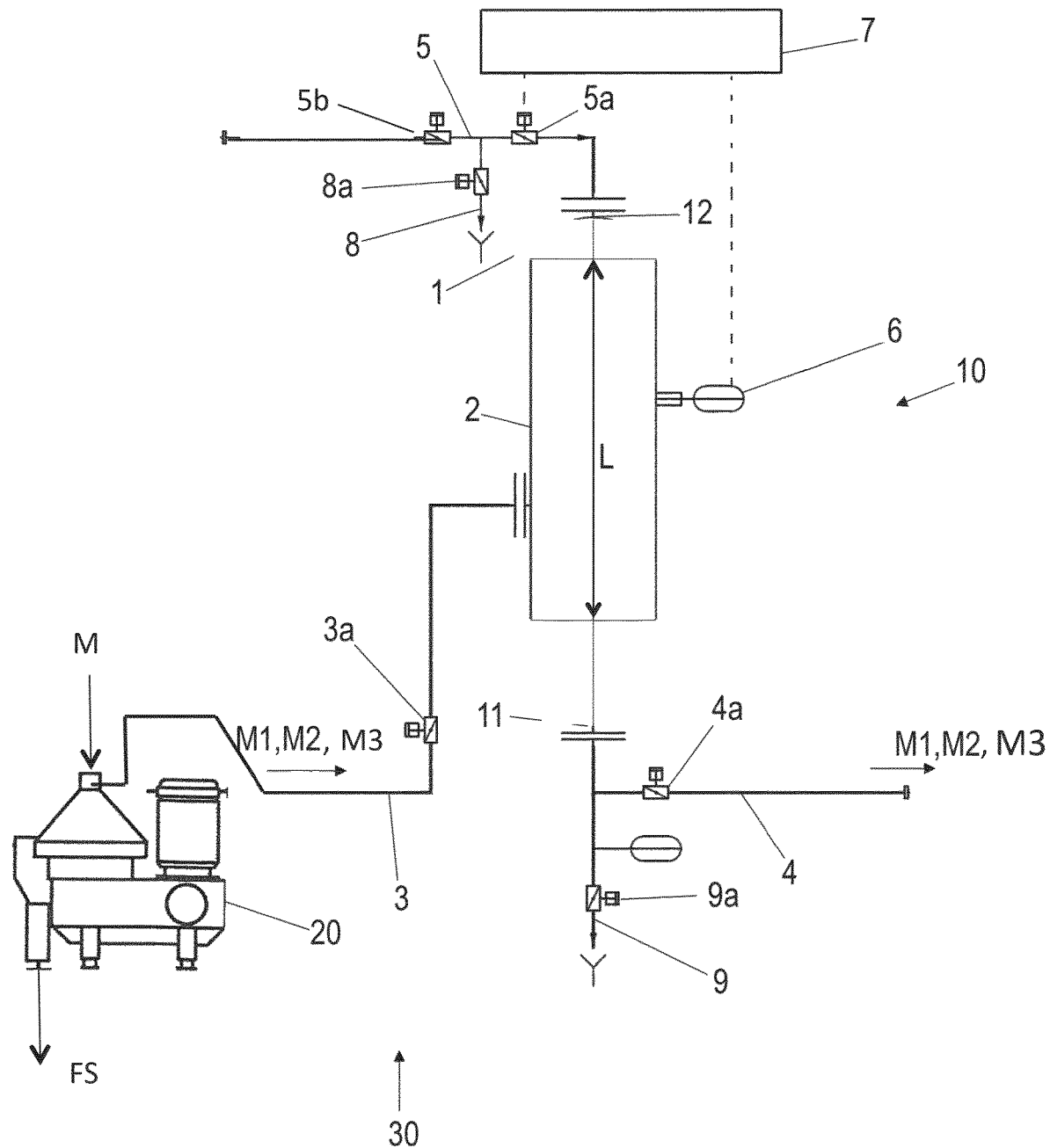

FACILITY FOR THE CENTRIFUGAL CLARIFICATION OF A SUSPENSION

BACKGROUND AND SUMMARY OF THE INVENTION

Exemplary embodiments of the present invention relate to a facility for the centrifugal clarification of a suspension, as well as a use of the facility and a method for the centrifugal clarification of the suspension.

When emptying a centrifuge bowl, the liquid flow at the outlet may stop for a short time due to solids ejection. When the emptying is finished, the liquid flow suddenly resumes, which leads to a pressure impulse in connected pipelines. Pipelines connected to the liquid outlet of the centrifuge cause vibrations due to these pressure pulses, which stress the mechanical attachment of the pipelines and the units connected to them.

The prior art already describes a number of possibilities for damping a pressure surge, which use gas for damping pressure surges. DE 10 2004 022 078 A1 describes a pipe system for the distribution of liquids in which pressures of 50 to 150 bar can occur. This leads to an effect which is described as "overfogging". The publication discusses the solution in this technical area by using a gas volume to dampen the pressure.

A gas volume is also already being used in other areas of technology to dampen pressure surges. A corresponding damping device is also called a hydrophore in the prior art and is known per se. However, depending on the type of application, there are also other variants to absorb pressure surges. For example, expansion vessels, so-called expansion tanks, are also known, which absorb pressure surges by their own expansion or expansion of an inner membrane.

Exemplary embodiments of the present invention are directed to reducing mechanical loads on units and piping connected to the centrifuge and at the same time to offer a compact solution in the form of a facility in which the centrifuge is integrated.

A facility for the centrifugal clarification of a suspension with provision of a first clarified liquid medium with a medium pressure comprises a centrifuge and a device for damping pressure surges.

The suspension can, for example, be a beer or beer pre-product, which is clarified during centrifugal processing. However, a corresponding processing in the form of clarification can also be performed on apple juice, wine, cider or other suspensions.

Pressure surges of the type described above can occur, for example, in a centrifuge that discharges intermittently or discontinuously, but especially in a separator with a so-called piston valve. Such separators with piston valves have been known for many decades.

The device for damping pressure surges connected to the centrifuge includes a container for passing through the medium discharged from the centrifuge. For this purpose, an inlet line of the device can be arranged in the container to the liquid outlet of the centrifuge. This inlet line is preferably arranged directly at the liquid outlet. The container also has an inlet for feeding a pressurizing gas into the container.

The volume of the container is at most twice as large as the receiving volume of the centrifuge, so that the container is not a larger dimensioned storage tank for a suspension or the like. The volume of the container can of course also be smaller than the receiving volume of the centrifuge. The receiving volume is the maximum volume with which the centrifuge can be filled without emptying. The device with the container is therefore to be understood as a hydrophore. However, conventional pipes of pipeline construction can also be used for the device, wherein the container can be designed as a pipe, preferably with a larger nominal diameter than an inlet and/or outlet line into the container. The pipe is preferably a pipe according to a common EN pipe class. The use of a pressure vessel, as used in the case of a hydrophore, can be advantageously dispensed with. The use of the above-mentioned device at a liquid outlet of a centrifuge is not known so far. The device enables a pressure surge damping, which reduces the mechanical load of following units, e.g. filling tanks, dosing systems and similar.

The device advantageously dampens or even completely eliminates pressure surges when emptying the centrifuge.

Surprisingly, it was found that despite the very intense pressure surges that occur in a centrifuge, it is sufficient to dampen the pressure surges, especially when emptying the centrifuge with a single container. This is therefore a solution in compact design for the above-mentioned problem.

The pressurizing gas is preferably arranged directly adjacent to the clarified medium in the tank.

The supply of the clarified medium into the vessel preferably takes place below the liquid level in the vessel, especially below a limit level.

The clarified medium can be discharged from the container at the lowest point of the container.

The device can be advantageously equipped with a first measuring device for adjusting the liquid level in the container. This serves to determine a lower limit level of the medium in the container. A limit switch or a level gauge can be used for this purpose. This measuring device can be arranged advantageously along the wall of the container.

The container can also have a separate inlet line and a separate outlet line for the medium. This allows the construction of the device to be kept very simple.

It is advantageous that the inlet and outlet lines of the device have the same diameter.

The inlet line can be arranged advantageously below the limit level.

The facility can also have an evaluation unit equipped to set a gas volume depending on an upper limit level of the medium in the container. This can be carried out by determining the upper limit level and then by adding a quantity of the pressurizing gas at a predetermined pressure.

The facility can also have a bypass, preferably with a bypass valve, which connects the tubular inlet for the pressurizing gas directly to the outlet line for the medium.

According to invention, the inlet for the pressurizing gas has a separate inlet and/or outlet connection for a cleaning medium, so that in case of cleaning the cleaning fluid also cleans the inlet area of the pressurizing gas.

This can be particularly advantageous for applications with foam-forming products such as beer, as the discharge can also be a product-contacting area in the event of a stronger pressure surge, which must be cleaned.

For optimum pressure distribution, it is also advantageous if the inlet is located at an upper end of the container. The container is formed in a tubular manner and has a longitudinal axis.

It is advantageous if the outlet line for the medium and/or an inlet and/or outlet connection for the cleaning medium is located at the bottom of the container. This ensures comprehensive cleaning and optimum guidance of the cleaning fluid within the tubular container.

Preferably, the envelope surface of the container can be designed as a conventional pipe according to an EN pipe class.

The container having, at least in some areas, a tubular envelope surface can have, at least in some areas, a tubular housing shell with a mean diameter which is at least twice as large, preferably 2.5 to 10 times as large, as the mean diameter of the inlet and/or the outline line. This already results in a pressure reduction of the medium when it is introduced into the container. In the case of a pressure surge, this medium pressure is then damped due to the pressurizing gas and is transferred evenly to the housing wall of the container.

The use of the facility according to the invention is particularly advantageous for the centrifugal processing of a suspension containing gas, preferably a carbonated beverage, especially beer. The use of the device with the pressurizing gas does not result in a reduction of the $CO_2$ content in the beer or a similar suspension when it is discharged from the centrifuge.

Furthermore, according to the invention, a method for the centrifugal clarification of a suspension in the facility according to the invention while providing a clarified liquid medium comprises the following steps:
  a) Clarification of the suspension in the centrifuge, in particular in a separator, while providing the clarified liquid medium with a medium pressure above 1 bar.
  b) Passing of the clarified medium through the container of the device, wherein a pressurizing gas with a gas pressure of more than 1 bar is arranged in the container, wherein the following relationship applies:

$p(M)=p(SG)$

Since the pressurizing gas is compressed in the case of a pressure surge and the pressure of the pressurizing gas is therefore equal to the pressure of the medium, the above-mentioned relationship also applies in the case of a pressure surge after setting a pressure equilibrium.

The pressurizing gas can advantageously be an inert gas, preferably carbon dioxide, nitrogen or a noble gas. This is particularly advantageous because there is no membrane between the pressurizing gas and the clarified medium, but the pressurizing gas is ideally located directly adjacent to the clarified medium. By using the inert gas, an undesired chemical side reaction (e.g. oxidation of the contents of the medium) is advantageously prevented.

The pressurizing gas is preferably arranged directly adjacent to the clarified medium when the medium is passed through.

After processing the liquid, e.g., beer, a CIP cleaning of the facility, including the device, can be carried out. For this purpose, the device can have separate connections for the discharge of a cleaning liquid.

Emptying of the centrifuge can be carried out according to the above-mentioned method, preferably intermittently or discontinuously, wherein a pressure surge, i.e., a pulse-like pressure increase, prevailing in the inlet line of the device, is reduced by at least 50% in the outlet line of the device.

BRIEF DESCRIPTION OF THE DRAWING FIGURES

The invention is explained in more detail below by means of an exemplary embodiment and by reference to a drawing, wherein:

FIG. 1 shows an embodiment variant of a facility according to the invention.

DETAILED DESCRIPTION

The facility 30 shown in FIG. 1 for the centrifugal clarification of a suspension M while producing a clarified medium M2 comprises a centrifuge 20, preferably a separator, in particular with a vertical axis of rotation, and a device 10 for damping pressure surges. Such pressure surges can occur when a solid FS collected in the centrifuge is emptied within a short time, e.g., 1 second. Due to the solids discharge, the flow in the liquid outlet of the centrifuge is reduced up to a flow standstill or even to a negative flow. Afterwards the flow rate increases again, which causes a pressure surge.

FIG. 1 shows a device 10 for damping pressure surges comprising a container 1 with a tubular envelope surface 2, preferably with a uniform tubular cross-section, which extends at least over a part of the length or over the entire length of the container along the longitudinal axis of the container 1. The envelope surface 2 may preferably extend over at least 50% of the length L of the container.

The container 1 has a tubular inlet line 3 for a clarified liquid medium M2 from a centrifuge 20 of facility 30 to device 10. The tubular inlet line 3 can have a valve 3a.

The container 1 also has a tubular outlet line 4 for the clarified medium M2 with an outlet valve 4a and an inlet 5 for a pressurizing gas SG with a valve 5a. Container 1 has a first measuring device 6 for monitoring a limit level. The measuring device 6 can preferably be a level gauge or a limit level switch.

The diameter of the container 1 can be at least twice, preferably at least three times the diameter of the inlet line 3 in the area of the envelope surface 2.

The average diameter of container 1 in the area of the envelope surface 2 is between 100 and 500 mm, which is particularly preferred. In contrast, the inlet line 3 and/or the outlet line 4 have an average diameter between 25 and 125 mm.

In the context of the invention, the mean diameter is to be understood as the average value of all diameters of a polygonal pipe along a pipe cross-section, for example. The same applies to pipes with oval pipe cross-sections or other pipe cross-sections.

The adaptation of the pipe cross-section from the inlet line 3 and/or the outlet line 4 into container 1 can advantageously be carried out with standard reducers or bottoms, which preferably do not require any further tests for pressure or design.

In the following, the function of the device 10 is explained in detail:

In step 1, the container with the at least partially tubular envelope surface 1 is filled with a first medium M1, typically water. The filling can be carried out until the container 1 is completely filled with the first medium M1. The inlet and outlet valves 3a and 4a are open. The valve 5b can be closed. The medium M1 has a medium pressure p(M1). Valves 5a and 8a can be open for possible venting of container 1 and the piping.

In step 2, the medium M1 is pressurized with the pressurizing gas SG. The pressurization causes a displacement of the first medium M1 until the pressure drops below the lower limit level. This is detected by the measuring device 6. The valves 3a, 4a are still open to ensure a displacement of the medium. However, a predetermined counter pressure, as gas pressure p(SG), is now generated by the pressurizing gas SG, which is reduced when the pressure falls below the limit level so that an equilibrium is achieved. The following then applies:

$p(M1)=p(SG)$

Then valves 3a and 4a are closed and the actual clarified medium M2, which was previously processed by centrifuge 20, can be introduced. The first medium M1 can also be passed through centrifuge 20.

Steps 1 and 2 are therefore preparatory steps before filling the facility according to the invention with the actual first medium to be processed by the facility.

In step 3, the container is filled with this clarified liquid medium M2, which was previously processed by centrifuge 20. This clarified medium M2 can preferably be a carbonated medium, e.g., beer. This clarified medium M2 displaces the first medium M1 when filling container 1. Ideally, the medium pressure of the clarified medium p(M2) corresponds to the medium pressure of the first medium p(M1).

The supply of the clarified liquid medium M2 into container 1 can be radial or tangential. Tangential means that the medium M is not fed into container 1 perpendicular to the longitudinal axis of the container.

Within container 1, a second measuring device can optionally be arranged to determine a further upper limit level.

In all cases, the valves 3a, 4a and 5a are regulated by an evaluation unit 7, which receives the measuring signals of the first measuring device 6 and, optionally, of the non-displayed second measuring device and performs a corresponding valve regulation for the introduction and discharge of the media M1, M2 and/or the pressurizing gas SG.

The inflowing first medium can be fed either tangentially or, as shown in FIG. 1, radially into container 1 and leaves it via the outlet line 4. The system back pressure of the pressurizing gas and the volume of the pressurizing gas result in a stable condition for the level in container 1, forming a compressible gas volume in the upper area of the vessel. If pressure surges come from the inlet line 3, the energy of the pressure surge is distributed over the entire container 1, so that only a minimal pressure change can be detected at the outlet line 4, which does not influence the following lines and units. When gas bubbles enter the vessel with at least some areas of a tubular envelope surface, they rise and are deposited on the surface.

If no pressure surge occurs, the clarified medium M2 is passed at a constant filling level through the pressurized container 1.

In the event of a pressure surge, the pressure behind the outlet valve 4a remains almost constant, since the pressure surge is absorbed by compression of the pressurizing gas.

At the end of the centrifugal processing of the suspension to be clarified, the clarified medium M2 in container 1 is displaced by introducing a cleaning medium into container 1. The cleaning medium M3 is preferably water or a cleaning solution.

By means of additional discharge connections 8, 9 with corresponding valves 8a, 9a, a separate CIP cleaning of the container can thus optionally be performed by introducing a cleaning medium M3.

By interposing the device 10 shown in FIG. 1, a pressure surge decoupling of units and piping systems to be connected to the centrifuge 20 can be achieved.

The compensation of dynamic pressure surges by device 10 can also prevent gas bubbles from separating from the liquid in the event of a drastic change in flow rate, so that in the case of beer no carbon dioxide escapes from the beer. In addition, flow compensation can be carried out to a certain extent.

The use of the device 10 in the facility 30 according to the invention with a centrifuge 20 is particularly helpful if further units are to be connected to the device. As the outgoing short-term liquid flow comes to a standstill during the emptying of a centrifuge, there are pressure surges on the one hand, which occur massively when following liquid strikes the standing column, and on the other hand, the saturation pressure of gas-containing products falls below saturation pressure, which leads to the formation of gas bubbles or to a reduced gas content, e.g., in a carbonated beverage. This is advantageously avoided by facility 30 with centrifuge 20 and device 10 following a centrifuge 20.

Container 1 can also be cleaned. For cleaning, the lower outlet valve 4a can be closed and a cleaning medium M3 can be fed to container 1 after its feed through the inlet line 3. Thereby the container 1 can be completely flooded with the cleaning medium M3.

At a lower end 11 of container 1 and at an upper end 12 of container 1 the cleaning medium M3 can be drained off. The cleaning medium M3 can also preferably be introduced radially into container 1. The upper and lower ends refer to the earth's gravity field. By means of a tangential inflow of the cleaning medium M3, a rotation of the cleaning liquid can take place in container 1, i.e. as a rotary flow, which additionally supports the cleaning process.

If the cleaning medium M3 is drained off through the discharge connections 8, 9, it is then discarded.

Valves 8a and 9a can be clocked or alternately switched during cleaning in order to achieve the lowest possible loss of cleaning medium. At the same time, valves 3a and 4a can be switched so that the cleaning medium M3 is continuously passed through device 10. In this way, the entire facility 30 can be cleaned in a CIP process.

After cleaning, the container 1 can be emptied and the device can be prepared again for the supply of the first medium M1 with steps 1 and 2.

For this purpose, residues of the cleaning medium M3 can be pressed out of the device 10 by repeated supply of pressurizing gas SG with at least one open valve 4a, 8a and/or 9a.

It is understood that the switching states of the valves 8a, 9a of the discharge connection 8, 9 for a cleaning fluid can also be regulated by the evaluation unit 7.

In the following, some of the advantages of the facility 30 and the device 10 are explained again:

The device 10 compensates pressure surges and can optionally separate gas bubbles.

Device 10 can also be cleaned preferably in-line by CIP. No return pump is required for cleaning device 10.

By means of an appropriate container with a tubular envelope surface design made of piping components at least in some areas, this has a high pressure and vacuum safety.

The device 10 requires low effort with regard to technical documentation and can be operated and cleaned advantageously and preferably alternately with hot and cold media.

An inert gas, preferably carbon dioxide or nitrogen, or a noble gas can be used as pressurizing gas.

In addition, no pump is required to empty the container or reach the outlet flow during the passage of the first medium through the device.

Although the invention has been illustrated and described in detail by way of preferred embodiments, the invention is not limited by the examples disclosed, and other variations can be derived from these by the person skilled in the art without leaving the scope of the invention. It is therefore clear that there is a plurality of possible variations. It is also clear that embodiments stated by way of example are only really examples that are not to be seen as limiting the scope, application possibilities or configuration of the invention in any way. In fact, the preceding description and the description of the figures enable the person skilled in the art to implement the exemplary embodiments in concrete manner, wherein, with the knowledge of the disclosed inventive concept, the person skilled in the art is able to undertake various changes, for example, with regard to the functioning or arrangement of individual elements stated in an exemplary embodiment without leaving the scope of the invention, which is defined by the claims and their legal equivalents, such as further explanations in the description.

LIST OF REFERENCE NUMERALS

1 Container
2 Envelope surface
3 Inlet line
3a Inlet valve
4 Outlet line
4a Outlet valve
5 Inlet
5a, 5b Valve
6 Measuring device
7 Evaluation unit
8 Discharge connection
8a Valve
9 Discharge connection
9a Valve
10 Device
11 Lower end
12 Upper end
20 Centrifuge
30 Facility
M Suspension
M2 Clarified medium
M1 First medium
M3 Cleaning medium
FS Solid
L Length

The invention claimed is:

1. A facility for the centrifugal clarification of a suspension medium while providing a clarified liquid medium with a medium pressure, the facility comprising:
   a centrifuge;
   a device for damping pressure surges having a container with at least one tubular envelope surface arranged, at least in some sections, for conducting the medium, wherein the container is arranged at a liquid outlet of the centrifuge, wherein the container has an inlet for supplying a pressurizing gas, and wherein a volume of the container is at most twice as large as a receiving volume of the centrifuge;
   a level gauge or limit level switch configured to measure a limit level of the suspension medium in the container; and
   an evaluation unit configured to set a gas volume as a function of the limit level of the suspension medium in the container,
   wherein the inlet for supplying the pressurizing gas has a separate outlet connection for a cleaning medium.

2. The facility of claim 1, wherein the device for damping pressure surges includes the level gauge of the limit level switch.

3. The facility of claim 2, wherein the container has an inlet line and an outlet line for the suspension medium.

4. The facility of claim 1, wherein the inlet is located at an upper end of the container.

5. The facility of claim 3, wherein the outlet line of the suspension medium or a discharge connection for the cleaning medium is arranged at a lower end of the container.

6. The facility of claim 5, wherein the separate outlet connection or the separate outlet connection and the discharge connection each have at least one valve, wherein switching states of the valve or the valves is regulated by the evaluation unit.

7. The facility of claim 3, wherein the tubular envelope surface of the container has a mean diameter that is at least twice as large as a mean diameter of the inlet line or the outlet line.

8. The facility of claim 3, wherein the tubular envelope surface of the container has a mean diameter that is between 2.5 to 10 times as large as a mean diameter of the inlet line or the outlet line.

9. The facility of claim 1, wherein the envelope surface of the container is as a pipe conforming to an EN pipe class.

10. A method for the centrifugal clarification of a suspension medium to produce a clarified liquid medium in a facility comprising a centrifuge, a device for damping pressure surges having a container with at least one tubular envelope surface arranged, at least in some sections, for conducting the medium, a level gauge or limit level switch configured to measure a limit level of the suspension medium in the container, and wherein the container is arranged at a liquid outlet of the centrifuge, the method comprising: treating the suspension medium in the centrifuge while providing the clarified medium with a medium pressure above 1 bar; passing the clarified medium through the container of the device, wherein a pressurizing gas with a gas pressure is arranged in the container, wherein the medium pressure is equal to the gas pressure arranged in the container; and measuring, by the level gauge or limit level switch, the limit level of the suspension medium in the container, wherein an evaluation unit sets a gas volume depending on a limit level of the suspension medium in the container via an inlet for supplying the pressurizing gas to the container, wherein the inlet for the pressurizing gas has a separate outlet connection for a cleaning medium, and wherein a volume of the container is at most twice as large as a receiving volume of the centrifuge.

11. The method of claim 10, wherein the pressurizing gas is an inert gas.

12. The method of claim 11, wherein the inert gas is $CO_2$, $N_2$, or a noble gas.

13. The method of claim 10, wherein the pressurizing gas is arranged immediately adjacent to the clarified liquid medium when the clarified liquid medium is passed through.

14. The method of claim 10, wherein after the suspension medium liquid has been processed, a clean-in-place cleaning of the facility, including the device, is carried out.

* * * * *